Jan. 20, 1959 A. BOSCHI 2,869,811
RESILIENT MOUNTINGS
Filed May 19, 1952 2 Sheets-Sheet 2

INVENTOR
ANTONIO BOSCHI,

United States Patent Office 2,869,811
Patented Jan. 20, 1959

2,869,811

RESILIENT MOUNTINGS

Antonio Boschi, Milan, Italy, assignor to Societa Applicazioni Gomma Antivibranti, Milan, Italy Application May 19, 1952, Serial No. 288,731

7 Claims. (Cl. 248—9)

This invention pertains to resilient mountings for machines (especially vehicle motors), and more particularly has reference to elastic supports, primarily for the spring suspension of automotive vehicle engines. It provides an elastic support for machine mountings which require a high degree of resiliency under static load, and also which require effective stiffening in both vertical directions when oscillations of considerable amplitude are encountered.

It is necessary that these requirements be met, in the case of an automobile engine spring support, in order to properly absorb the vibrations caused by the engine and thus minimize their transmission to the vehicle frame, and also to absorb the shocks caused by rough road conditions and thus substantially prevent the transmission of such shocks from the frame to the engine.

It is accordingly an object of this invention to provide a resilient mounting having a high degree of resiliency under static loads, with resulting low frequency of vibration of the supported machine.

Another object is to provide a resilient mounting having special arrangements to minimize both upward and downward shocks which would otherwise be transmitted by a highly resilient mounting from the supporting frame to the supported machine, owing to the inertia of said machine, as for example, when irregular road prominences and depressions are encountered by a moving motor vehicle.

A further object is to provide a resilient mounting having symmetric limit stops as a part of the special arrangements mentioned in the preceding object of my invention.

Figure 1:
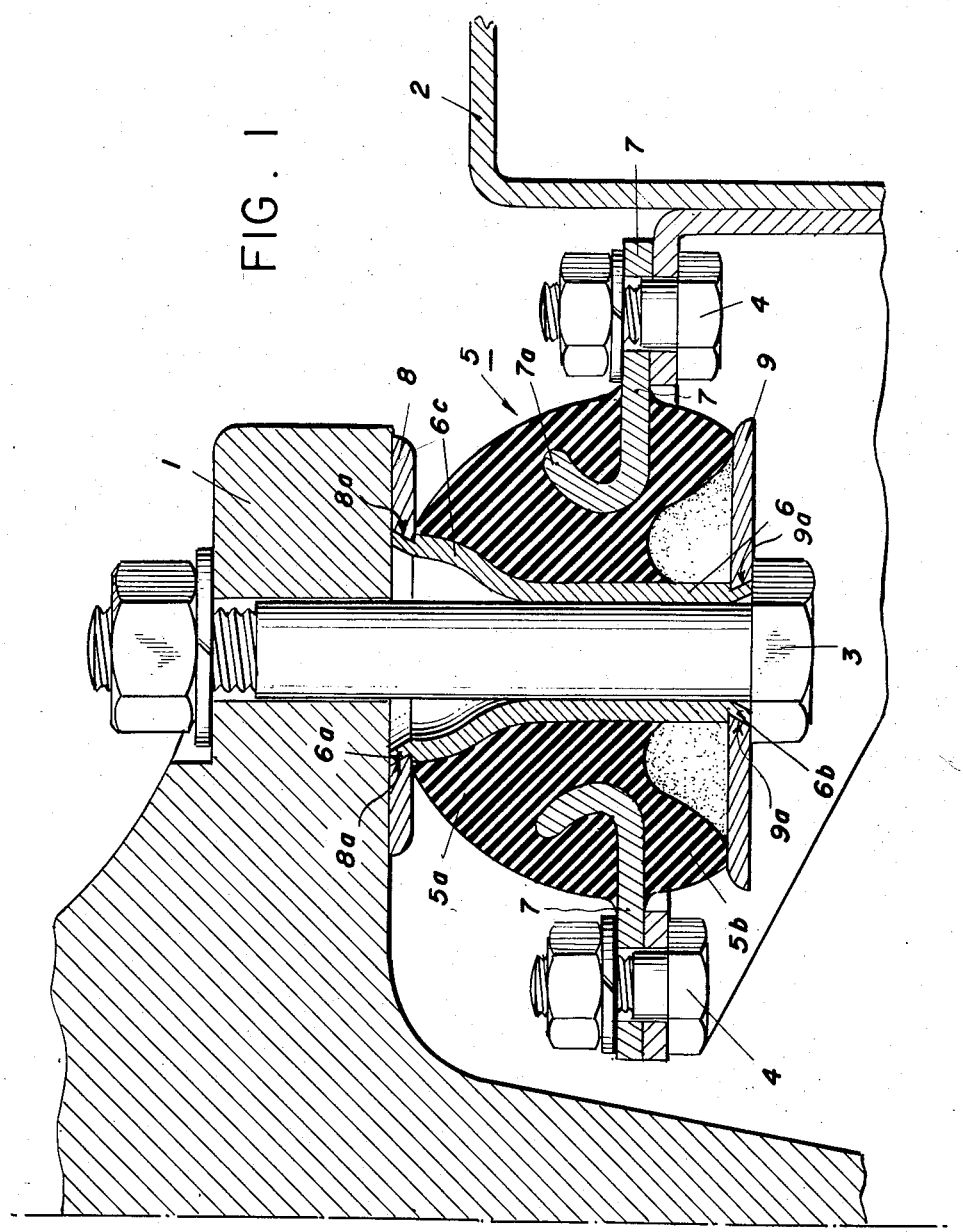
Figure 2:
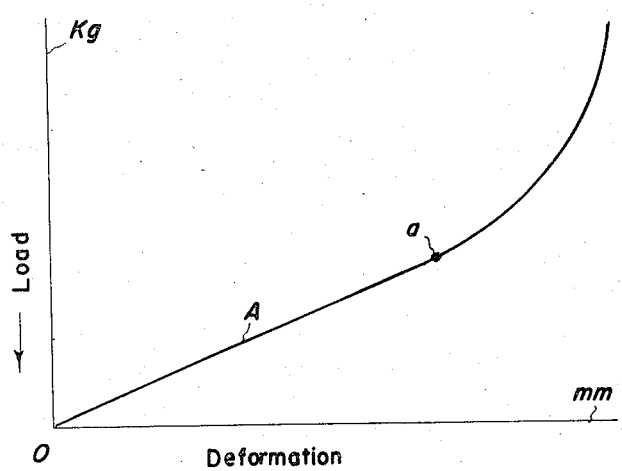
Figure 3:
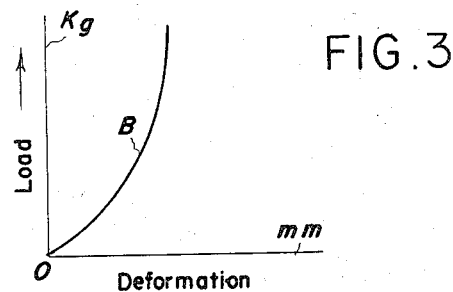
Figure 4:
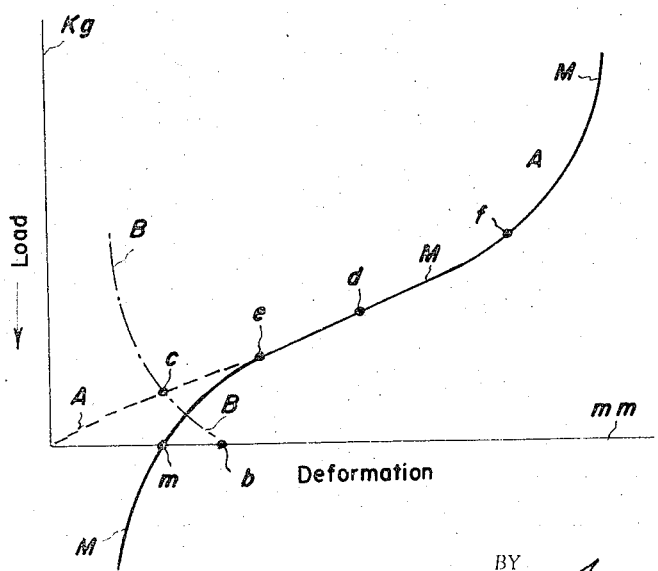

With these and other objects in view which may be incident to my improvements, my invention consists in the combination and arrangement of elements hereinafter described and illustrated, by way of example, in the accompanying drawings, in which:

Figure 1 is a diametral section of an assembled resilient support constructed according to my invention; and Figures 2, 3 and 4 are diagrams of the elastic properties of the support shown in Figure 1.

Referring now to Figure 1, the reference numeral 1 denotes the end of an engine, resiliently mounted upon a frame 2 of a motor vehicle, by means of my improved support, which is secured to the engine by a bolt 3 and to the frame by a plurality of bolts 4. The support proper comprises a rubber ring 5, interposed between and vulcanized to a central rigid metal sleeve 6, and a concentric, rigid, annular plate 7, whose inner portion is embedded in said ring. The rubber ring 5 consists of an upper part $5^a$ (above plate 7), and a lower part $5^b$ (below plate 7); of which the former is pre-stressed by compression between the plate 7 and an upper disc 8 abutting engine 1, and the latter is similarly pre-stressed by compression between said plate 7 and a lower disc 9 supported by bolt 3.

The amount of axial precompression of parts $5^a$ and $5^b$ of ring 5 is determined by making the axial length of sleeve 6 shorter than the free (undeformed) height of ring 5, to the extent of the selected amount of said precompression. The precompression of ring 5 is thus effected during the assembly of discs 8 and 9 to sleeve 6, before said sleeve is attached to the engine 1 by bolt 3.

The pre-stressing of parts $5^a$ and $5^b$ of ring 5 is maintained by locking the disc 8 to the upper end of sleeve 6, with any convenient locking device, such as a caulked collar $6^a$, set into a countersunk hole $8^a$ in the center of disc 8, and by similarly locking the disc 9 to the lower end of sleeve 6 by means of a collar $6^b$, set into a countersunk hole $9^a$ in the center of disc 9.

Considering separately the parts $5^a$ and $5^b$ of ring 5, it will be noted that the former has a dome-shaped outer surface which progressively contacts an increasingly larger area of the plate 8 as the rubber deforms under superimposed load. It will also be noted that the inner portion of the plate 7 terminates in an upwardly and outwardly bent flange $7^a$, which defines a truncated-conical throat surrounding the sleeve 6 and opposing (in an upwardly and inwardly sloping direction) an outwardly and upwardly flared conical portion $6^c$ on the upper end of sleeve 6. By virtue of the shape and arrangement of the parts just described, the bending-shearing and compression stresses initially exerted upon the rubber in the part $5^a$ are gradually converted into an increasing compression stress between the disc 8 and the truncated cone shaped portion $6^c$ of the sleeve 6 on one side, and between disc 8 and the truncated conical flange $7^a$ of the plate 7 on the other side. The stiffening effect of this conversion of stresses in the rubber element $5^a$, with increasing load, is indicated by the line "A" in Figure 2, which clearly shows that the deformation of the part $5^a$ increases with increasing load, in approximately linear proportion, until a selected point, such as "a" is reached; whereupon further increase in load results in a progressively decreasing deformation of the part $5^a$, as indicated by the upper curved portion of the line A.

Considering now the part $5^b$, as distinct from the part $5^a$, it will be noted that, as the sleeve 6 descends under load by virtue of the deformation of the part $5^a$, the part $5^b$ is progressively relieved of its pre-compression stresses until it assumes its original unstressed shape; whereupon further lowering of the sleeve 6, under increasing load, results in separating the part $5^b$ from all contact with the disc 9. Conversely, when the sleeve 6 rises under decreasing load, the part $5^b$ is stressed in compression, with a progressively decreasing deformation as the load increases, as indicated by the curve "B" of Figure 3. The part $5^b$ thus functions as a compression-stressed return buffer which minimizes the rebound of the spring support under shocks caused by rough road conditions.

In the no-load condition (as the support, though assembled, is conventionally shown in Fig. 1), the parts $5^a$ and $5^b$, pre-stressed as aforesaid, are in a balanced state, and such an equilibrium condition corresponds to the point "m" on the composite curve "M—M," in the load/deformation diagram of Figure 4, wherein the curve "A—A" corresponds to the curve "A" of Figure 2 for the part $5^a$, and the curve "B—B" corresponds to the curve B of Figure 3, for the part $5^b$, except that the slope of the curve "B—B" is the reverse of the curve "B," since the load in Figure 4 is indicated as acting in downward direction. The horizontal distance O–b, between the point "b" on the curve "B—B" and the point O on the vertical load axis indicates the amount of precompression of the part $5^b$ under no-load condition of the support. The point "c," where the curves A—A and B—B intersect, indicates the point at which the deformations of the parts $5^a$ and $5^b$, under the same load, are equal; and it will be noted that the point "*m*," on the composite load/deformation curve "M—M" (for the entire rubber ring 5), is vertically below the point "*c*," so that the horizontal distance O–*m* indicates the amount of precompression of the entire rubber ring 5, under no-load condition.

Under static load only, the support works in the vicinity of the point "*d*" (on the curve M—M of Figure 4), and by suitably adjusting the hardness and degree of pre-stressing of the rubber ring 5, the point "*d*" can be made to coincide with the point of inflexion (reversal) of the substantially straight line central portion (*e–f*) of the curve M—M, which corresponds to the highest resiliency. With increasing load, the part 5$^b$ is first relieved of its pre-stressing and then wholly separated from contact with the disc 9, while the part 5$^a$ becomes wholly stiff (point *f* in Figure 4), thus acting as a proper limit stop. Conversely, under decreasing load (below point "*d*"), the buffer part 5$^b$ comes gradually into contact with the disc 9 and this results in a stiffening of the support in the opposite direction. Thus, with a support constructed in accordance with my invention, there is obtained a load/deformation curve (M—M in Figure 4) which is substantially symmetric about the static load point "*d*," and slopes gradually in opposite directions beyond its central portion *e–f*.

When my improved support is used for mounting stationary machines, the arrangement is essentially the same as shown in Figure 1, assuming that the reference numeral 1 denotes the base of the machine and 2 denotes the supporting foundation into which the anchor bolts 4 are set. While I have described the elastic ring 5 as composed of rubber, it is to be understood that I use the word "rubber" in its generic sense, so as to include any similar material having substantially the same properties as rubber.

While I have shown and described the preferred embodiment of my invention, I desire it to be understood that I do not limit myself to the precise details of construction and arrangement of elements disclosed by way of illustration, as these may be changed and modified by those skilled in the art without departing from the spirit of my invention, or exceeding the scope of the appended claims.

I claim:

1. A resilient support for machines comprising: a rubber ring having a dome-shaped outer surface and supported at a region intermediate its opposite ends by a rigid, concentric, annular plate having an inner portion flared upwardly and outwardly into a frusto-conical shape and embedded in said ring, and a flat outer portion attached to a supporting base; said ring having an annular, peripheral portion extending below said plate; a flat rigid, annular, load-bearing disc, abutting a portion of the supported machine, and a rigid, annular buffer disc attached to said load-bearing disc, in fixed spaced relationship therewith, by a rigid, tubular sleeve passing vertically through the central portion of said ring; said ring being interposed between said discs which are secured by a bolt to the supported machine; said ring and load-bearing disc being so constructed and arranged in relationship with each other that their adjacent surfaces define an intervening angular space which is gradually reduced so that said surfaces contact each other over a progressively increasing area as the load on said support is increased; said buffer disc and said ring being so constructed and positioned that only the lower end of said peripheral portion contacts said buffer disc under no-load condition, and moves out of said contact when a load of selected weight is applied to said support.

2. A resilient support according to claim 1, wherein said sleeve holds said discs in spaced relationship less than the axial undeformed dimension of said ring, whereby said ring is prestressed in axial compression between said discs to a selected degree during the assembly of said parts in said support.

3. A resilient support according to claim 1, wherein said sleeve has an upwardly flared conical portion on its upper end; the maximum diameter of said flared portion of said sleeve being less than the diameter of said flared portion of said plate, so that said ring is gradually compressed between said load-bearing disc and the flared portions of said sleeve and plate, and is thus deformed at a progressively increasing rate up to selected point under static loading, and is further deformed at a progressively decreasing rate as the load on said support is increased beyond said selected point.

4. A resilient support according to claim 1, wherein said ring is bonded to the outer surface of said sleeve.

5. A resilient support according to claim 3, wherein the minimum diameter of said flared portion of said sleeve, is less than the minimum diameter of the opening in said frusto-conical portion of said plate, and said diameters are so related that said ring has a substantially free initial movement in shear and bending, whereby the bending-shearing stresses initially imparted to said rubber ring, when a load is applied to said support, are gradually converted into increasing compression stresses, when said load is increased.

6. A resilient support according to claim 1, wherein the lower portion of said ring below said plate is tapered downwardly toward said buffer disc which reduces the cross-sectional area of said portion and increases its deformability.

7. A resilient support for machines comprising: a rubber ring having a dome-shaped outer surface and supported at a region intermediate its opposite ends by a rigid, concentric, flat, circular plate having a central aperture defined by an inner portion permanently bent upwardly and outwardly and embedded in said ring; and a rigid, load-bearing sleeve attached to the supported machine and to inner surface of said ring, and having an upper portion above said plate, flared upwardly and outwardly in a shape similar to the bent portion of said plate; the maximum diameter of said flared portion of said sleeve being less than the minimum diameter of the central aperture of said plate, so that, upon application of load to said sleeve, said ring is so deformed as to be first stressed in bending-shear stresses, and then increasingly in compression stresses, as said load increases.

References Cited in the file of this patent

FOREIGN PATENTS

| | | |
|---|---|---|
| 463,322 | Canada | Feb. 21, 1950 |
| 524,203 | Great Britain | Aug. 1, 1940 |
| 545,162 | Great Britain | May 13, 1942 |
| 586,608 | Great Britain | Mar. 25, 1947 |
| 618,962 | Great Britain | Mar. 2, 1949 |